US007136683B2

(12) United States Patent
Eisenhower, Jr. et al.

(10) Patent No.: US 7,136,683 B2
(45) Date of Patent: Nov. 14, 2006

(54) SURFACE ACOUSTIC WAVE SENSOR AND RADIO FREQUENCY IDENTIFICATION INTERROGATOR FIXTURE

(75) Inventors: Gary W. Eisenhower, Jr., Freeport, IL (US); Brian J. Marsh, Freeport, IL (US); Roger L. Larson, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 10/806,987

(22) Filed: Mar. 23, 2004

(65) Prior Publication Data

US 2005/0215294 A1    Sep. 29, 2005

(51) Int. Cl.
*H04B 17/00* (2006.01)
(52) U.S. Cl. ............... 455/575.1; 455/575.7; 455/67.11; 455/345; 455/349; 343/893; 343/906
(58) Field of Classification Search ............... 455/552, 455/86, 267, 315, 188.1, 575.7, 575.9, 67.11, 455/345, 349; 343/713, 873, 872, 893, 906, 343/770, 767; 340/445, 442, 447, 505, 713
See application file for complete search history.

(56) References Cited

U.S. PATENT DOCUMENTS

| 4,216,401 | A |   | 8/1980  | Wagner ............... 310/313 R |
| 4,454,440 | A |   | 6/1984  | Cullen ................ 310/313 R |
| 4,823,141 | A | * | 4/1989  | Ohe et al. .................. 343/713 |
| 4,978,941 | A |   | 12/1990 | Brown ..................... 340/447 |
| 5,821,425 | A |   | 10/1998 | Mariani et al. ............ 73/703 |
| 6,079,276 | A |   | 6/2000  | Frick et al. ................. 73/718 |
| 6,218,936 | B1 |   | 4/2001  | Imao ........................ 340/447 |
| 6,259,360 | B1 |   | 7/2001  | Takamura .................. 340/445 |
| 6,450,021 | B1 |   | 9/2002  | Katou et al. .............. 73/146.5 |
| 6,484,585 | B1 |   | 11/2002 | Sittler et al. ................ 73/718 |
| 6,487,681 | B1 |   | 11/2002 | Tuttle et al. |
| 6,571,638 | B1 |   | 6/2003  | Hines et al. ................ 73/702 |
| 6,703,935 | B1 |   | 3/2004  | Chung et al. ............ 340/572.7 |
| 6,964,198 | B1 | * | 11/2005 | Eisenhower, Jr. ............ 73/717 |
| 7,000,461 | B1 | * | 2/2006  | Eisenhower et al. ....... 73/146.5 |
| 2002/0152794 | A1 | * | 10/2002 | Dietrich et al. ............ 73/1.57 |
| 2005/0076982 | A1 | * | 4/2005  | Metcalf et al. .......... 152/152.1 |
| 2005/0088361 | A1 | * | 4/2005  | Kelly et al. ................. 343/873 |

FOREIGN PATENT DOCUMENTS

DE         10211198 A1    9/2003
WO      WO 01/36221 A1    5/2001

* cited by examiner

*Primary Examiner*—George Eng
*Assistant Examiner*—Nam Huynh
(74) *Attorney, Agent, or Firm*—Kermit D. Lopez; Luis M. Ortiz

(57) ABSTRACT

A wireless sensor fixture system and method are disclosed in which an antenna block is provided that includes a plurality of grooves, wherein such grooves maintain a plurality of antennas located on a portion of the antenna block. A top locator block can be positioned above the antenna block, wherein the top locator comprises a top surface having depression thereon for receiving and locating a patch, which can receives wireless signals from the antennas for sensor testing thereof, wherein the patch comprises a SAW sensor and an RFID tag over-molded into the patch. Additionally, an antenna cover can be connected to the antenna block for protecting the plurality of antennas and wiring thereof. A BNC connector protrudes from the antenna block and is electrically connected to the plurality of antennas via the wiring thereof.

20 Claims, 6 Drawing Sheets

SURFACE ACOUSTIC WAVE SENSOR AND RADIO FREQUENCY IDENTIFICATION INTERROGATOR FIXTURE

TECHNICAL FIELD

Embodiments generally relate to sensing methods and systems. Embodiments are also related to pressure and temperature sensors. Embodiments are additionally related to surface acoustic wave (SAW) devices and sensors, and in particular to testing methods and systems thereof. Embodiments also relate to Radio Frequency Identification (RFID) Tags.

BACKGROUND OF THE INVENTION

Various sensors are known in the pressure and temperature sensing arts. The ability to detect pressure and/or temperature is an advantage to any devices which are under constant temperature and which can be severely affected by temperature conditions. An example of such a device is an automobile tire, which of course, experiences variations in both temperature and pressure. Many different techniques have been proposed for sensing the pressure and/or temperature in tires, and for delivering this information to the operator at a central location on the vehicle so that he knows that a tire is at low or high air pressure.

Such sensors generally communicate with the vehicle so that the sensed pressure and/or temperature are displayed to the operator when the vehicle is moving, i.e. the wheel rotating relative to the body of the vehicle. Such devices are generally relatively complex and expensive or alternatively are not particularly robust.

Some tire pressure and/or temperature sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multi-polar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multi-polar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

One type of sensor that has found wide use in pressure and temperature sensing applications, such as, vehicle tires, is the Surface Acoustic Wave (SAW) sensors, which can be composed of a sense element on a base and pressure transducer sensor diaphragm that is part of the cover. For a SAW sensor to function properly, the sensor diaphragm should generally be located in intimate contact with the sense element at all pressure levels and temperatures.

To compensate for expansion in the packaging, the sense element and sensor diaphragm must be preloaded when they are assembled to shift the output frequency a known amount, which ensures contact at all times. In conventional sensor designs, an interference fit between the cover and base can maintain a preload until the cover and base are locked in place by welding, soldering or other connecting means.

In order to properly configure a sensor, such, as a SAW sensor, the sensing device must undergo rigorous testing to ensure that the device will work properly under a variety of temperature and pressure conditions. A system should be implemented in which to test overall functionality in an environment similar to the type that the sensor will ultimately face. For example, a SAW sensor is ideally suited for use in sensing tire temperature and pressure conditions. The sensing device must be able to react to high and low temperatures (e.g., 100° C. to −40° C.), while also being able to react to varying pressure ranges (e.g., 0 psi to 150 psi). It therefore necessary to test the sensor to verify functionality over variations in temperature and pressure, and also to ensure that the sensor external components (e.g., sensor housing) can withstand these varied conditions.

Additionally, tests must be performed to ensure that sensor device components such as the housing will not be affected by RF frequencies due to the presence of wireless components, such as antennas. The housing and base of the sensor must also not be placed into a condition in which an electrical short runs from the housing to the base, causing a frequency shift or error in the sensor measurements. A need thus exists for an improved method and system for properly testing sensor devices, such as SAW sensors. It is believed that providing configuring a proper patch system, particularly one involving wireless capabilities, will greatly enhance sensor testing, and thus provide for sensors that are ultimately more efficient and sturdier than presently implemented sensors.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor testing method and system.

It is another aspect of the present invention to provide for a sensor testing method and system, which can be utilized to test the effectiveness of surface acoustic wave (SAW) sensors and devices.

It is yet another aspect of the present invention to provide for a wireless patch in which both a SAW sensor and an RFID tag are incorporated.

It is a further aspect of the present invention to provide for a test fixture which can send a receive frequency signals verifying the functionality of a wireless patch that incorporates both SAW sensor and RFID components.

The aforementioned aspects of the invention and other objectives and advantages can now be achieved as described herein. A wireless fixture system and method are disclosed in which an antenna block is provided that includes a plurality of grooves, wherein such grooves maintain a plurality of antennas located on a portion of the antenna block. A top locator block can be positioned above the antenna block, wherein the top locator comprises a top surface having depression thereon for receiving and locating a patch, which can receive wireless signals from the antennas for sensor testing thereof, wherein the patch comprises a SAW sensor and an RFID tag over-molded into the patch. Additionally, an antenna cover can be connected to the antenna block for protecting the plurality of antennas and wiring thereof. A BNC connector protrudes from the antenna block and is electrically connected to the plurality of antennas via the wiring thereof.

The patch itself can be formed from a rubber material. The antenna block preferably is configured from a material that is not affected by RF signals. Similarly, the antenna cover preferably comprises a material that is not affected by RF signals. The top locator block can be formed from an amorphous thermoplastic polyetherimide material. Such a system can be implemented as a combined SAW and RFID interrogator standards fixture which can send a frequency signal to the patch (i.e., SAW patch) at a fixed distance and orientation in order to verify that the SAW and RFID sensor (i.e., the SAW patch) is functioning properly and can send a signal pack to the test fixture.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
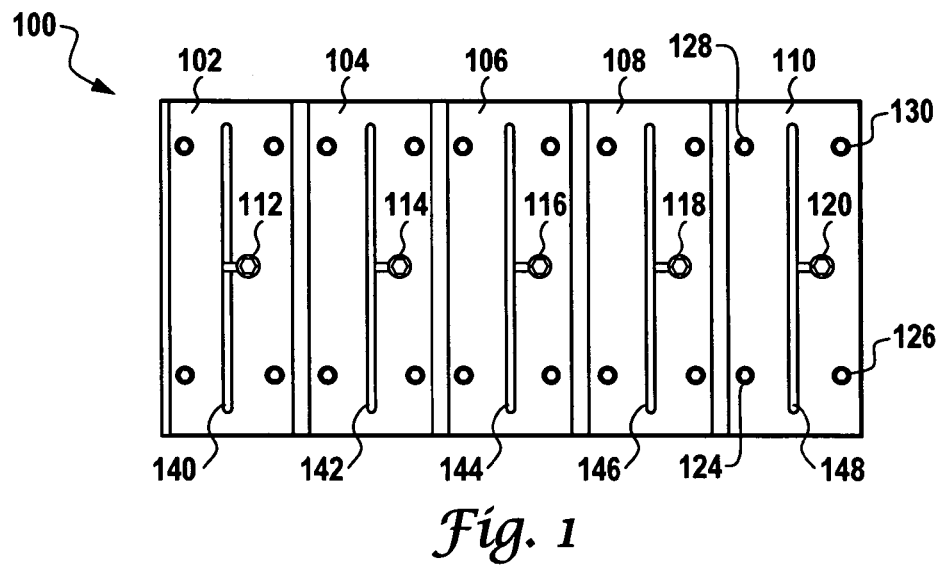
FIG. 1 illustrates a top view of a wireless sensor testing system, which can be implemented in accordance with one embodiment of the present invention.
Figure 2:
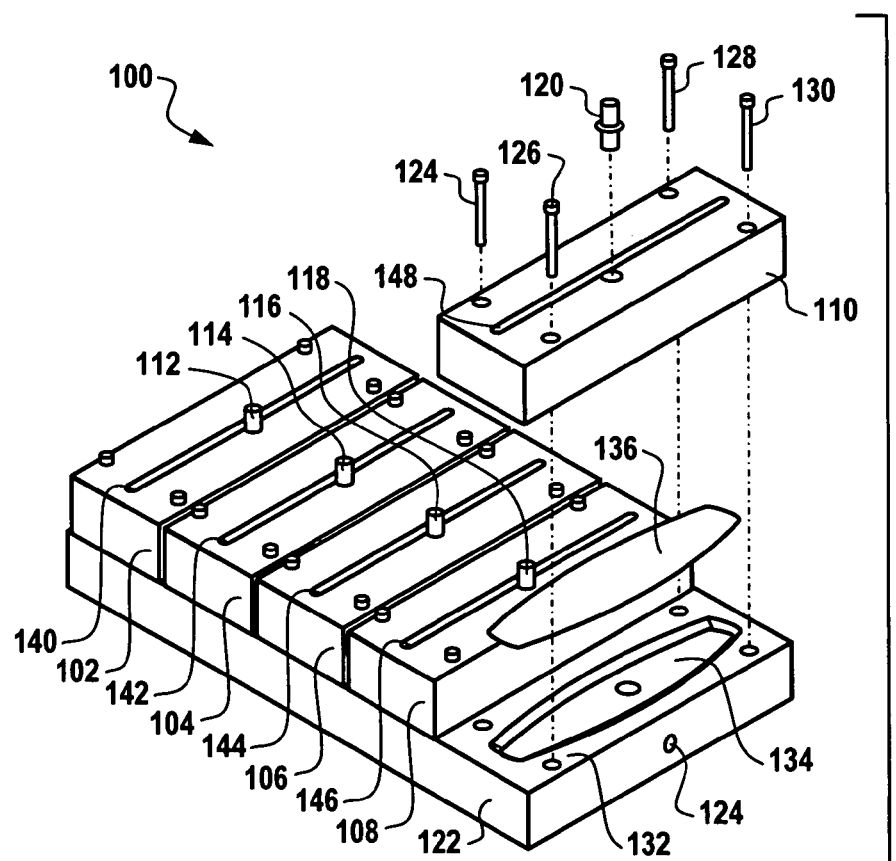
FIG. 2 illustrates a side perspective view of the wireless sensor testing system depicted in FIG. 1, in accordance with one embodiment of the present invention.
Figure 3:
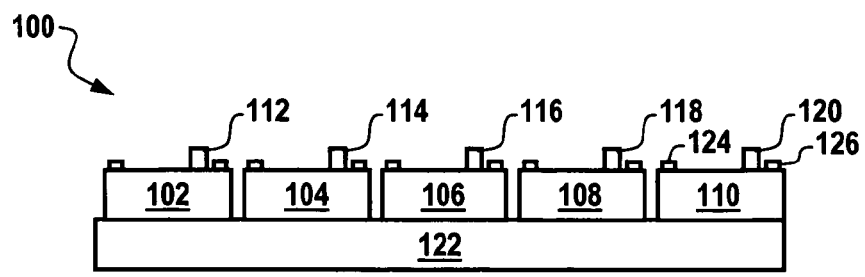
FIG. 3 illustrates a front view of the wireless sensor testing system depicted in FIGS. 1–2, in accordance with one embodiment of the present invention.
Figure 4:
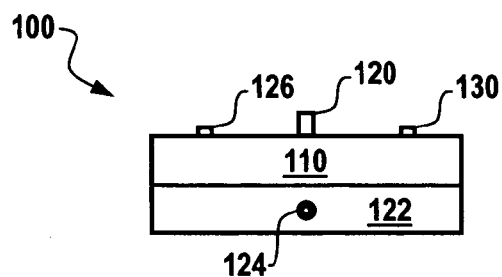
FIG. 4 illustrates a right side view of the wireless sensor testing system depicted in FIGS. 1–3, in accordance with one embodiment of the present invention.

FIG. 1 illustrates a top view of a wireless sensor testing system 100, which can be implemented in accordance with an embodiment of the present invention. FIG. 2 illustrates a side perspective view of the wireless sensor testing system 100 depicted in FIG. 1, in accordance with an embodiment of the present invention. FIG. 3 illustrates a front view of the wireless sensor testing system 100 depicted in FIGS. 1–2, in accordance with an embodiment of the present invention. FIG. 4 illustrates a right side view of the wireless sensor testing system 100 depicted in FIGS. 1–3, in accordance with an embodiment of the present invention.

System 100 generally includes a pressure rail 122 upon which are disposed a plurality of antenna blocks 102, 104, 106, 108, and 110. Pressure rail 122 includes a pressure inlet 124. Five individual depressions can be cut into the top surface of pressure rail 122 for placement and orientation of a SAW patch, such as, for example, SAW patch 136. Note that SAW patch 136 can be formed from a material such as rubber. An example of one depression cut into the top surface of pressure rail 122 is patch depression 134 depicted in FIG. 2. Pressure inlet 124 forms part of a pressure channel, which can be drilled through the center of pressure rail 122 to help pressurize a SAW button face that can be molded into each SAW patch (e.g., SAW patch 136). Each of the five locations upon which antenna blocks 102, 104, 106, 108, and 110 are located contains a dovetail groove milled into the sealing surface that holds a silicon O-Ring in place, while also assisting in retaining the O-ring. AN example of such a dovetail groove is O-ring groove 132 depicted in FIG. 2.

Each O-ring helps to seal against the respective antenna block that is held in place with four cap screws. For example, antenna block 110 is held in place by cap screws 124, 126, 128 and 130. Each of the antenna blocks 102, 104, 106, 108, and 110 can be configured to include two antennas mounted within respective antenna grooves, 140, 142, 144, 146, and 148, wherein each of the antennas are held in place with an adhesive, such as, for example, a silicone adhesive. Each of the two antennas can be wired to a respective BNC connector that protrudes from the top of each antenna block. For example, antenna block 110 is associated with a BNC connector 120.

Antenna blocks 102, 104, 106, 108, and 110 are respectively associated with BNC connectors 112, 114, 116, 118, and 120. Note that the term "BNC Connector" as utilized herein generally refers to a type of connector utilized with coaxial cables. The basic BNC connector is a male type mounted at each end of a cable. This connector has a center pin connected to the center cable conductor and a metal tube connected to the outer cable shield. A rotating ring outside the tube locks the cable to any female connector.

Figure 5:
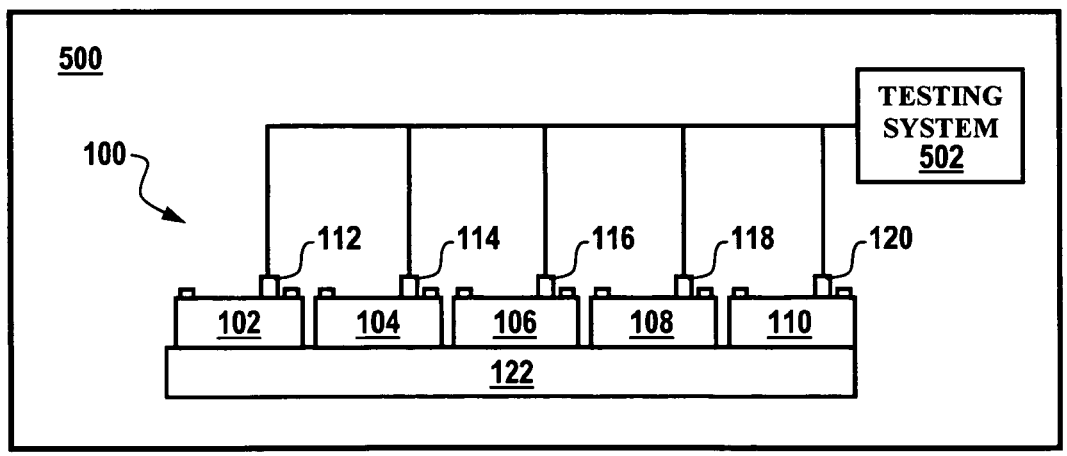
FIG. 5 illustrates a block diagram of a system for SAW testing, in accordance with an embodiment of the present invention.

FIG. 5 illustrates a block diagram of a system 500 for SAW testing, in accordance with an embodiment of the present invention. Note that in FIGS. 1–5, similar or identical parts or elements are generally indicated by identical reference numerals. Thus, according to system 500, each BNC connector 112, 114, 116, 118, and 120 can be connected to a test system 502 that monitors and regulates temperature and pressure conditions. In general, system 500 can be adapted for use as a SAW tire pressure management patch wireless test rail, which includes approximately five rubber patches that can be pressurized up to 150 psi, and which can also be heated up to approximately 135 degrees Celsius, while an embedded antenna interrogates a SAW patch, such as, for example, SAW patch 136. System 500 allows the SAW patch to react both to temperature and pressure while being interrogated at a fixed distance in order to help collect final test data.

Figure 6:
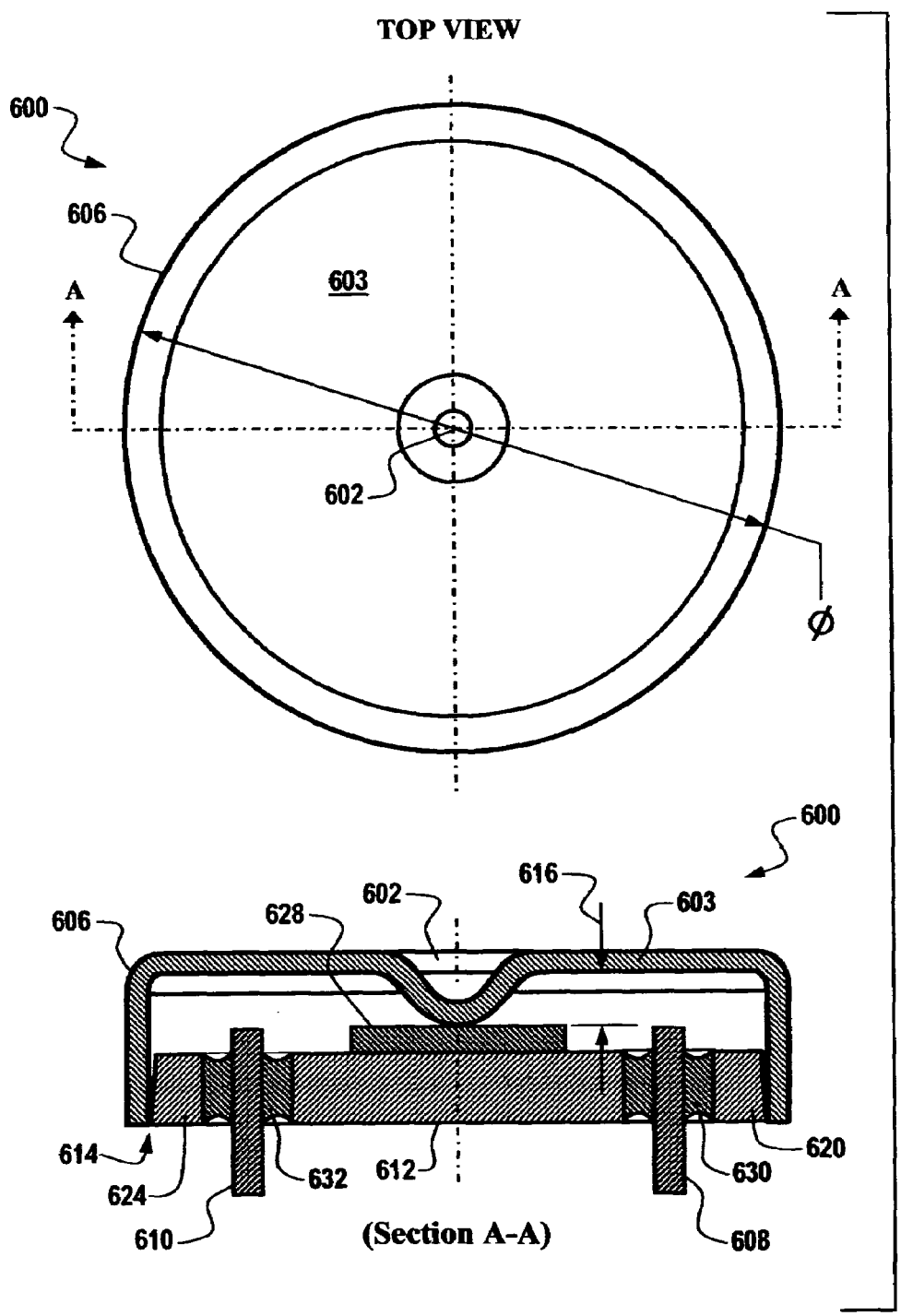
FIG. 6 illustrates top and side views of a sensor, which can be tested by the testing system depicted in FIGS. 1–4, in accordance with an embodiment of the present invention.

FIG. 6 illustrates top and side views of a sensor 600, which can be tested by the testing system 100 depicted in FIGS. 1–3, in accordance with an embodiment of the present invention. Sensor 600 generally comprises a SAW button sensor or sensory assembly. Sensor 600 includes a sensor base which is composed of base portions 620, 612 and 624. Two pins 608 and 610 can be mounted and/or connected to the sensor base. Such pins 608 and 610 can be located within areas 630 and 632 of the sensor base. Sensor 600 generally includes a sensor cover 606 which can be configured to include a dimple 602. Note that the particular shape and size of dimple 602 can vary, depending on particular applications. The dimple 602 depicted in FIG. 6 is thus presented for illustrative purposes only and the size and shape thereof are not considered limiting features of the present invention.

A sensor element 628 can be located adjacent to or on base portion 612 in a manner that that permits clearances to form between sensor cover 606 and the sensor base composed of base portions 620, 612 and 624. A sensor diaphragm 603 can be incorporated into the sensor cover 606. The cover 606 can be located the sensor base such that the dimple 602 is in intimate contact with the sensor element 628 at all pressure levels and temperatures thereof.

It can be appreciated from FIG. 6, that instead of using an interference fit between the cover and base, the components thereof can be designed to form a clearance or gap between the cover and base. Such a design does not rely on an interference between the two parts to maintain preload, but instead can utilize welding, soldering or other connecting means to lock the components in position at the time the cover is assembled to the base.

The components can be designed such that even if the cover is at its smallest inside dimension within the tolerance range and the base is at its largest outside dimension within the tolerance range there will be clearance between them when they are assembled together. Thus, a clearance should exist generally between the cover and base even if the cover is at its smallest dimension within the tolerance range and the base is at its largest dimension within the tolerance range. The intent of such a feature is to produce the parts at their nominal dimension.

Sensor 600 can also be modified for use with radio-frequency identification (RFID) tags. Sensor 600 and an RFID tag can be over-molded into a rubber patch, such as, for example, patch 136 depicted in FIG. 2 and/or patch 720, which is described in more detail herein with respect to FIGS. 7–11. Sensor 600 can therefore function as a combined SAW and RFID sensor that permits proximity-based communications between a reader and multiple transponders. Such a reader can constantly transmit radio messages. Whenever a reader is close enough to a transponder, the transponder can awaken and transmits stored data to the reader.

As utilized herein with respect to the invention, the term "RFID tag," "RF tag," "tag," and so forth generally can refer to a device that includes a loop antenna of one or more turns coupled to an electronic device, wherein the electronic device both receives signals via the loop antenna and transmits signals via the loop antenna. The received signals with respect to the wireless article may include signals for controlling and/or operating the electronic device and/or for being stored in a memory associated therewith, whether embodied in the same or a separate electronic chip. The transmitted signals with respect to the wireless article may include information that is stored in the memory of or associated with the electronic device and may include information previously received and stored therein. It is noted that the "received signals" with respect to the wireless article are "transmitted signals" with respect to the antenna arrangement, and that the "transmitted signals" with respect to the wireless article are "received signals" with respect to the antenna arrangement.

Such tag or other wireless article may be part of the object to be detected/identified, or may be made on a rigid or flexible substrate that is placed with and/or attached to such object, such as by adhesive or a strap or tie or the like, or by being packaged therewith, either permanently or releasably, as may be desired for a particular application. Where the object is metallic or otherwise electrically conductive, the wireless article can be spaced away from the object a sufficient distance, e.g., a few millimeters, to allow operation of its antenna for communication of signals.

Based on the foregoing it can be appreciated that some embodiments disclosed herein relate to a sensor testing system and method. In general, a pressure rail having a top surface and a bottom surface and one or more pressure inlets to a pressure channel can be located within the pressure rail. The pressure channel can be drilled into the pressure rail. A plurality of patch depressions can be formed into a plurality of sealing surfaces on the top surface of the pressure rail upon which a patch is positioned. A plurality of antenna blocks is generally disposed upon the pressure rail, wherein each antenna block thereof includes at least two antennas. Two antennas can be connected to a respective antenna block among the plurality of antenna blocks utilizing a silicone adhesive. Each antenna block is respectively located on the pressure rail in order to provide wireless data indicative of pressure and temperature conditions associated with each patch among the plurality of patches.

Additionally, a plurality of BNC connectors can be respectively connected to the plurality of antenna blocks, wherein each BNC connector thereof is respectively connected to and protrudes from each antenna block thereof. Each sealing surface among the plurality of sealing surfaces can be configured to contain a groove that retains a respective O-ring In place. The patch itself can comprise a SAW patch. Also, a plurality of cap screws can be provided for holding In place an antenna block among the plurality of antenna blocks and for sealing the respective O-ring against a respective antenna block among the plurality of antenna blocks. The pressure rail therefore can generally function as a SAW tire pressure measurement patch wireless test rail. The SAW patch reacts to both temperatures and pressure while being interrogated wireless at a fixed distance in order to collect test data indicative of the SAW patch.

The SAW Tire Pressure Measurement Patch Wireless test rail disclosed herein can be configured to permit five or more rubber patches to be pressurized up to 150 psi and to be heated up to 125 degrees Celsius while the imbedded antenna interrogates the SAW patch. This allows the SAW patch to react both to temperature and pressure while being interrogated at a fixed distance to help collect final test data.

The test fixture can be configured using Ultem® material for the top antenna blocks and bottom pressure rail. The pressure rail generally contains five or more (or less) individual depressions cut into the top surface for placement and orientation of the SAW Patch. A pressure channel can be drilled through the center of the rail to help pressurize the SAW button face that is molded into the patch. Each of the five locations contains a dovetail groove milled into the sealing surface that holds a Silicon O-ring in place that also helps retain the o-ring. The O-ring seals off against the Antenna block that is held in place with four cap screws. The Antenna block contains two antennas mounted inside to grooves held in place with RTV Silicone adhesive. The two antennas can be wired to the BNC connector that protrudes out from the top of the Antenna block. The BNC connector can be connected to a test system for monitoring and regulating the temperature and pressure.

Figure 7:
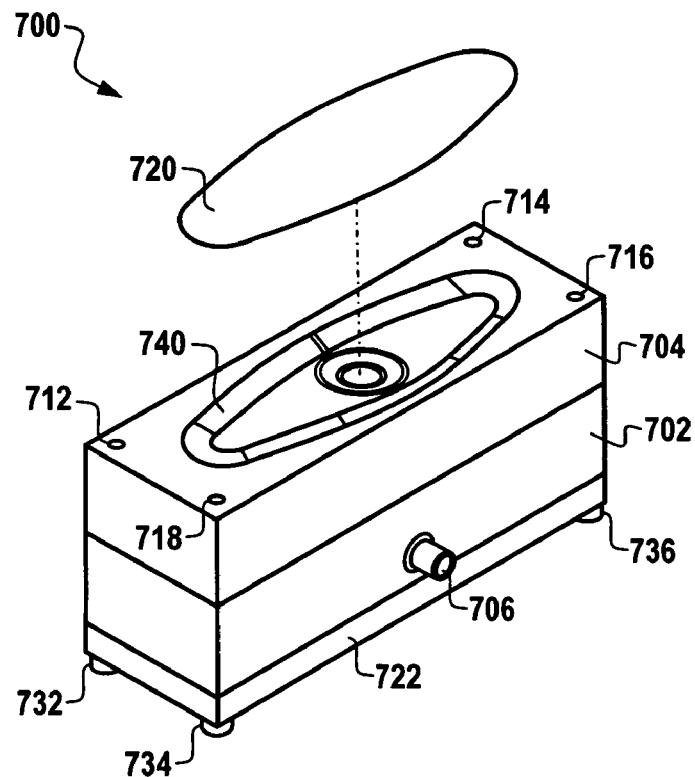
FIG. 7 illustrates a side perspective view of a SAW sensor and RFID interrogator system, which can be implemented in accordance with a preferred embodiment of the present invention.
Figure 8:
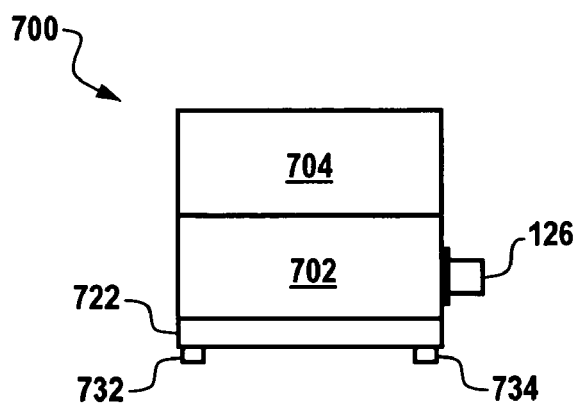
FIG. 8 illustrates a side view of the SAW sensor and RFID interrogator system depicted in FIG. 7, in accordance with a preferred embodiment of the present invention.
Figure 9:
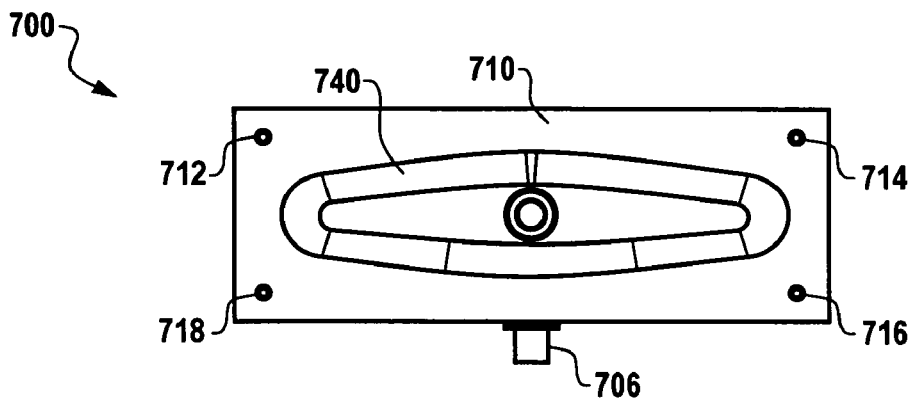
FIG. 9 illustrates a top view of the SAW sensor and RFID interrogator system depicted in FIG. 7, in accordance with a preferred embodiment of the present invention.
Figure 10:
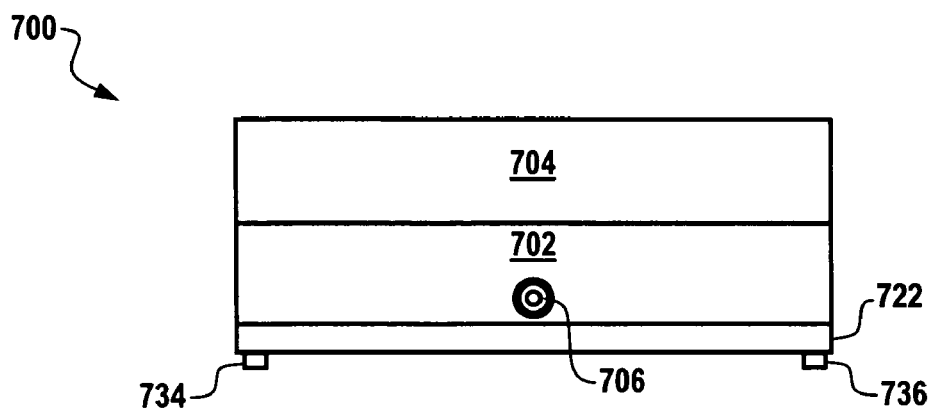
FIG. 10 illustrates a front view of the SAW sensor and RFID interrogator system depicted in FIG. 7, in accordance with a preferred embodiment of the present invention.
Figure 11:
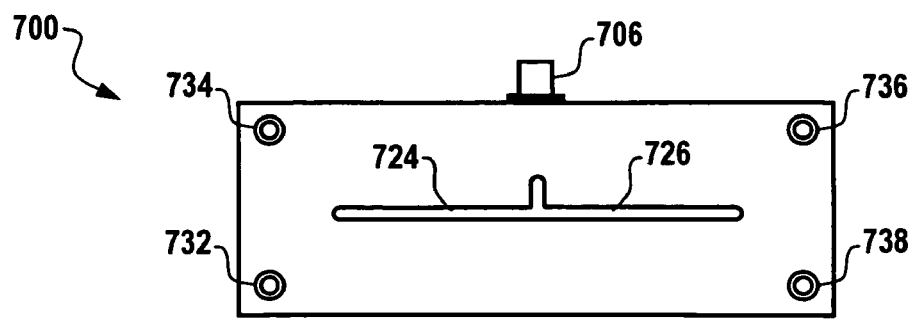
FIG. 11 illustrates a bottom view of the SAW sensor and RFID interrogator system depicted in FIG. 7, in accordance with a preferred embodiment of the present invention.

FIG. 7 illustrates a side perspective view of a SAW sensor and RFID interrogator system 700, which can be implemented in accordance with a preferred embodiment of the present invention. FIG. 8 illustrates a side view of system 700 depicted in FIG. 7, in accordance with a preferred embodiment of the present invention. FIG. 9 illustrates a top view of system 700 depicted in FIG. 7, in accordance with a preferred embodiment of the present invention. FIG. 10 illustrates a front view of system 700 depicted in FIG. 7, in accordance with a preferred embodiment of the present invention. FIG. 11 illustrates a bottom view of system 700 depicted in FIG. 7, in accordance with a preferred embodiment of the present invention. Note that in FIGS. 7–11, similar or identical parts are generally indicated by identical reference numerals.

System 700 can be configured as fixture (i.e., a SAW sensor and RFID interrogator fixture) that generally includes an antenna block 702 which is positioned below a top locator block 704. Antenna block 702 is located above an antenna cover 722. Thus, antenna block 702 is sandwiched between antenna cover 722 and top locator block 704. Additionally, antenna cover 722 sits atop four feet 732, 734, 736, and 738, which support antenna cover 722, antenna block 702 and top locator block 704. System 700 can also include a SAW patch 720, which is analogous to SAW patch 136 depicted in FIG. 2.

A BNC connector 706 can protrude from antenna block 702. BNC connector is similar to BNC connectors 112, 114, 116, 118, and 120 depicted in FIGS. 1–4, the difference being that BNC connector extends in a direction generally perpendicular to the length of SAW patch 720. In the configuration depicted in FIGS. 1–4, the BNC connectors 112, 114, 116, 118, and 120 protrude through the center of respective SAW patches, such as, for example, SAW patch 136 shown in FIG. 2. A plurality of screws 712, 714, 716, and 718 are generally disposed upon top locator block 704, and analogous to cap screws 124, 126, 128 and 130 depicted in FIGS. 1–4.

Antenna block 702 and antenna cover 722 can be formed from a plastic material, such as, for example, Delrin®, which is a type of material, which possesses many of the same characteristics of industrial metals such as brass, aluminum, zinc, and stainless steel. Some comparable properties include stiffness, dimensional stability, impact resistance, and structural strength. The use of a material such as Delrin® is preferred because as Delrin® material is typically not affected by RF signals. Delrin® is a trademark of the Dupont Corporation. Top locator block 704, on the other hand, can be formed from a material such as an Ultem® resin. An Ultem® resin is an amorphous thermoplastic polyetherimide offering outstanding high heat resistance, high strength, modulus and broad chemical resistance. Ultem® is a trademark of the General Electric Corporation.

Top locator block 704 generally includes a depression 740, which can be cut into the top surface in the same configuration as the SAW patch 720 for proper orientation and placement thereof. Antenna block 702 can include two or more grooves milled into for respectively positioning antennas 724 and 726, which can be connected to the BNC connector 706 on the front of the block. Antenna cover 722 can assist in protecting antennas 724, 726 and associated wiring. SAW sensor and RFID interrogator system 700 can therefore send a frequency signal to SAW patch 720, which is located at a fixed distance and orientation thereof in order to verify that a SAW/RFID sensor (e.g., sensor 600) is functioning properly, and can transmit a signal back to the test fixture.

Figure 12:
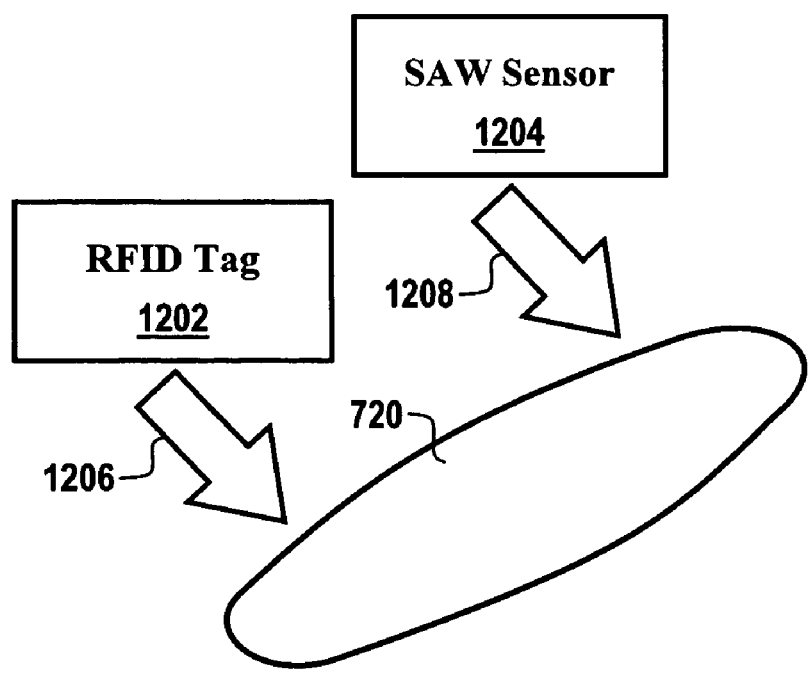
FIG. 12 illustrates a perspective view of the patch depicted in FIGS. 7–11, in accordance with a preferred embodiment of the present invention.

FIG. 12 illustrates a perspective view of the patch 720 depicted in FIGS. 7–11, in accordance with a preferred embodiment of the present invention. Block 1202 generally represents an RFID tag component, while block 1204 generally represents a SAW sensor or SAW component. Arrows 1206 and 1208 represent an over-molding process or operation. Thus, the RFID tag component represented by block 1202 and the SAW sensor or SAW component represent by block 1204 can be over-molded into patch 720 and adapted for use with the system depicted in FIGS. 7–11 herein. It can be appreciated, of course, that the patch 136 (and additional patches thereof) of FIGS. 1–4 can also be configured according the process depicted in FIG. 12. Thus, patch 136 of FIGS. 1–4 can also be configured as a rubber patch into which a SAW sensor and RFID tag or RFID component can be over-molded.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A wireless fixture system, comprising:
   an antenna block comprising a plurality of grooves, wherein said plurality of grooves maintain a plurality of antennas located on at least one portion of said antenna block; and
   a top locator block located above said antenna block, wherein said top locator comprises a top surface having depression thereon for receiving and locating a patch, which can receive wireless signals from said plurality of antennas for sensor testing thereof.

2. The system of claim 1 further comprising:
   an antenna cover connected to said antenna block for protecting said plurality of antennas and wiring thereof
   a BNC connector that protrudes from said antenna block and is electrically connected to said plurality of antennas via said wiring thereof.

3. The system of claim 1, wherein said patch comprises a SAW sensor and an RFID tag over-molded into said patch.

4. The system of claim 3, wherein said patch comprises a rubber material.

5. The system of claim 3 wherein said antenna block comprises a material that is not affected by RF signals.

6. The system of claim 3 wherein said antenna cover comprises a material that is not affected by RF signals.

7. The system of claim 1 wherein said top locator block is formed from an amorphous thermoplastic polyetherimide material.

8. The system of claim 1 wherein said plurality of grooves comprises two grooves.

9. The system of claim 8 wherein said plurality of antennas comprises two antennas.

10. The system of claim 1 wherein said patch comprises a SAW patch and wherein said antenna block further comprises a pressure test rail enabling said SAW patch to react to both temperature and pressure while being interrogated wirelessly at a fixed distance in order to collect test data indicative of said SAW patch.

11. A wireless test fixture system, comprising:
    an antenna block comprising a plurality of grooves, wherein said plurality of grooves maintain a plurality of antennas located on at least one portion of said antenna block;
    a top locator block located above said antenna block, wherein said top locator comprises a top surface having depression thereon for receiving and locating a patch, which can receives wireless signals from said plurality of antennas for sensor testing thereof, wherein said patch comprises a SAW sensor and an RFID tag over-molded into said patch;
    an antenna cover connected to said antenna block for protecting said plurality of antennas and wiring thereof; and
    a BNC connector that protrudes from said antenna block and is electrically connected to said plurality of antennas via said wiring thereof.

12. The system of claim 11 wherein:
    said patch comprises a rubber material;
    said antenna block comprises a material that is not affected by RF signals;
    said antenna cover comprises a material that is not affected by RF signals; and
    said top locator block is formed from an amorphous thermoplastic polyetherimide material.

13. A wireless sensor fixture method, comprising the steps of:
    providing an antenna block comprising a plurality of grooves, wherein said plurality of grooves maintain a plurality of antennas located on at least one portion of said antenna block; and
    positioning a top locator block above said antenna block, wherein said top locator comprises a top surface having depression thereon for receiving and locating a patch, which can receives wireless signals from said plurality of antennas for sensor testing thereof.

14. The method of claim 13 further comprising the steps of:
    connecting an antenna cover to said antenna block for protecting said plurality of antennas and wiring thereof;
    providing a BNC connector that protrudes from said antenna block; and
    electrically connecting said BNC connector to said plurality of antennas via said wiring thereof.

15. The method of claim 13 further comprising the step of configuring said patch to comprise a SAW sensor and an RFID tag over-molded into said patch.

16. The method of claim 15 wherein said patch comprises a rubber material.

17. The method of claim 15 further comprising the step of configuring said antenna block to comprise a material that Is not affected by RF signals.

18. The method of claim 15 further comprising the step of configuring said antenna cover to comprise a material that Is not affected by RF signals.

19. The method of claim 13 further comprising the step of configuring said top locator block from an amorphous thermoplastic polyetherimide material.

20. The method of claim 13 further comprising the steps of:
    configuring said plurality of grooves to comprise only two grooves;
    configuring said plurality of antennas to comprise only two antennas respectively associated with said two grooves; and
    configuring said antenna block, said antenna cover and said top locator block to each comprise a rectangular shape.

* * * * *